3,275,413
PROCESS FOR PREPARING PYROSULFURYL FLUORIDE AND PYROSULFURYL CHLOROFLUORIDE
Richard F. Schwarer, West Haven, Santad Kongpricha, Hamden, and William C. Preusse, Orange, Conn., assignors to Olin Mathieson Chemical Corporation, New Haven, Conn., a corporation of Virginia
No Drawing. Filed Jan. 25, 1963, Ser. No. 253,998
4 Claims. (Cl. 23—203)

This invention relates to a process for preparing halogenated derivatives of pyrosulfuric acid, and more particularly it relates to an improved process for preparing pyrosulfuryl fluoride [$S_2O_5F_2$] and pyrosulfuryl chlorofluoride [$S_2O_5ClF$].

Both of these compounds are useful as intermediates in the preparation of various derivatives containing fluorine and sulfur. For example, pyrosulfuryl fluoride has been used as an intermediate in the preparation of fluorosulfonates, fluorsulfonic acid esters and sulfur oxyfluorides. An efficient and economical process for the preparation of these intermediates is therefore desirable.

Pyrosulfuryl fluoride has been prepared previously by a variety of methods. It has been prepared by the reaction of sulfur trioxide with fluoride salts, by the reaction of pyrosulfuryl dichloride with benzoylfluoride, by the reaction of fluorosulfonic acid with arsenic pentoxide and by the reaction of sulfur dioxide with fluorine fluorosulfonate. For one reason or another, these processes are not satisfactory for practical use. Some of the chemicals involved in these methods are expensive and not readily available, others are toxic and the use of others such as, for example, sulfur trioxide is accompanied by special handling problems.

Pyrosulfuryl fluoride has also been prepared by the reaction of cyanogen chloride and fluorosulfonic acid. However, cyanogen chloride is a difficult compound to handle, and its use is accompanied with undesirable and even dangerous process conditions. The chloride is not readily available. It is relatively unstable and is subject to explosive polymerizations. At room temperature, it is a gas which is toxic and a lachrymator.

The primary object of this invention was to provide a simple and direct process for the preparation of several halogenated derivatives of pyrosulfuric acid. Another object of this invention was to provide a process for the preparation of pyrosulfuryl fluoride and pyrosulfuryl chlorofluoride using reactants which are safe and readily available from commercial sources. Still another object of this invention was to provide a process for preparing pyrosulfuryl fluoride in high yield and excellent purity using a single reactor operated under atmospheric conditions. Other objects are listed in the following discussion.

These objects have been accomplished in accordance with this invention. Unexpectedly, it has been found that cyanuric chloride can be reacted with fluorosulfonic acid to yield the aforementioned halogenated derivatives of pyrosulfuric acid. The process provided herein for the preparation of these derivatives is simple and direct, and it is particularly attractive since the reaction proceeds smoothly in a single reactor using reactants which are readily available from commercial sources. The solid cyanuric chloride can be handled without difficulty, and this compound is stable at temperatures up to about 200° C. The process does not involve the use of drastic conditions, such as high pressures or extremely high reaction temperatures and can be carried out in glass apparatus.

Briefly, the process of this invention comprises reacting cyanuric chloride with at least a stoichiometric amount of fluorosulfonic acid at a reaction temperature of from about 120° C. to about 200° C. and distilling the halogenated derivatives of pyrosulfuric acid from the reaction mixture. The mechanism of the reaction is not completely understood, but in the preparation of pyrosulfuryl fluoride it appears that a stoichiometric amount of fluorosulfonic acid is six moles per mole of cyanuric chloride. Hydrogen chloride is evolved during the reaction process.

Either of the illustrated halogenated derivatives may be obtained via the above generally described process. It appears that pyrosulfuryl chlorofluoride is first formed by the reaction of the cyanuric chloride with the fluorosulfonic acid and if desired this may be removed from the reaction mixture. However, the chlorofluoride apparently is readily converted into pyrosulfuryl fluoride by further reaction. Therefore, the process described herein will provide over 90% yields of very pure pyrosulfuryl fluoride, while somewhat lesser yields of pyrosulfuryl chlorofluoride are obtained due to conversion of the chlorofluoride to pyrosulfuryl fluoride.

The process conditions can be controlled so that either the fluoride or the chlorofluoride can be obtained as the desired reaction product. This is particularly the case in the preparation of pyrosulfuryl fluoride since this compound can be obtained in high purity and excellent yield by distilling it from the reaction mixture at a head temperature of about 55° C. or less. As used in this specification, the term "head temperature" means the vapor temperature at the take-off portion of a distillation apparatus. This is accomplished by maintaining a high reflux ratio while slowly removing the formed pyrosulfuryl fluoride. The higher boiling chlorofluoride is maintained in the reaction mixture and is also subsequently converted to pyrosulfuryl fluoride. It is noted that in Example 1 described hereinafter the crude fluoride was removed from the reaction mixture at a head temperature of 24–35° C., while the purified product boils at 50–52° C. The evolution of the highly volatile hydrogen chloride during the reaction helps in the ready removal of condensate from the system.

On the other hand, the chlorofluoride is somewhat more difficult to isolate in high yield because of its tendency to be converted to the fluoride. However, good yields of this compound can be obtained by removing condensate from the system at a head temperature of from about 55° C. to about 105° C. This can be accomplished by maintaining a low reflux ratio and thereby removing a substantial amount of the chlorofluoride from the reaction system before it undergoes further reaction to form the fluoride. However, even under these circumstances, a fair amount of pyrosulfuryl fluoride will also be obtained. The pyrosulfuryl chlorofluoride can be purified by redistillation.

As mentioned above, at least a stoichiometric amount of fluorosulfonic acid should be employed in the instant process. However, it is preferred to utilize from 30% to 100% molar excess of fluorosulfonic acid over the stoichiometric quantity.

The following examples are illustrative of the process of this invention. It is to be understood that they are not to be considered as limiting the scope of this invention, as modifications would be apparent to one skilled in the art.

*Example 1*

A 500 ml. round bottom flask was equipped with an 18 inch Vigreux column connected at the top to a West condenser and a distillation receiver. Into the flask was placed 400 g. (4.0 moles) of fluorosulfonic acid and 61.5 g. (0.33 mole) of cyanuric chloride. The solution was slowly heated, and when the temperature in the reaction flask reached 158° C., the first drop of product condensate was removed at a head temperature of 24° C. As the product condensate was continuously removed from the reaction mixture, the flask reaction temperature slowly rose to 186° C. after nineteen hours of operation. At this point, product condensate was being removed at a head temperature of 35° C. The reaction was then terminated, and the liquid condensate (201.0 g.) was fractionally distilled to yield 166.5 g. of water white liquid having a boiling point of 50–52° C. The following analytical data revealed that pyrosulfuryl fluoride had been obtained in high purity. Yield: 91.5%.

Analysis.—Calcd. for $S_2O_5F_2$: S, 35.1%; F, 20.9%. Found: S, 34.9%; F, 20.5%.

Infrared analysis showed the characteristic S—O bond at 6.6$\mu$ and 8.0$\mu$, while the S—F bond was shown by absorption peaks at 11.5$\mu$ and 12.1$\mu$. This data is in agreement with the infrared analysis for pyrosulfuryl fluoride found in Emeleus and Clark, J. Chem. Soc., 1958, 190.

*Example 2*

Into a 500 ml. round bottom flask equipped as in Example 1 was placed 61.5 g. (0.33 mole) of cyanuric chloride and 300 g. (3.0 moles) of fluorosulfonic acid. The solution was heated, and when the flask temperature reached 145° C. the first drop of condensate was removed at a head temperature of about 70° C. Over a four hour period, the flask temperature rose to 183° C. while the condensate at this point was being removed at a head temperature of about 105° C. The reaction was then terminated, and the liquid condensate (154.0 g.) was fractionally distilled to yield 37.0 g. of liquid having a boiling point of 100–101° C. The following analytical data revealed that this material was pyrosulfuryl chlorofluoride. The remaining crude condensate was a mixture of pyrosulfuryl fluoride and unreacted fluorosulfonic acid.

Analysis.—Calcd. for $S_2O_5ClF$: S, 32.2%; Cl, 17.9%; F, 9.56%. Found: S, 32.2%; Cl, 18.5%; F, 9.40%.

What is claimed is:

1. A process for preparing pyrosulfuryl fluoride and pyrosulfuryl chlorofluoride which comprises reacting cyanuric chloride with at least a stoichiometric amount of fluorosulfonic acid at a temperature range of about 120° C. to about 200° C. and distilling pyrosulfuryl fluoride and pyrosulfuryl chlorofluoride from the reaction mixture.

2. The process of claim 1 wherein fluorosulfonic acid is employed in an amount of 30% to 100% molar excess over the stoichiometric amount.

3. A process for preparing pyrosulfuryl fluoride which comprises reacting cyanuric chloride with at least a stoichiometric amount of fluorosulfonic acid at a temperature range of about 120° C. to about 200° C., and distilling pyrosulfuryl fluoride from the reaction mixture at a head temperature of about 55° C. or less.

4. The process of claim 3 wherein fluorosulfonic acid is employed in an amount of 30% to 100% molar excess over the stoichiometric amount.

References Cited by the Examiner

UNITED STATES PATENTS 2,565,771   8/1951   Kharasch _____ 23—14
3,101,334   8/1963   Friedrich _____ 260—248

FOREIGN PATENTS 945,239   7/1956   Germany.

OTHER REFERENCES

Angewandte Chemie, vol. 70, 1950, pp. 742, 743.
Chemische Berichte, vol. 95, No. 7, 1962, pp. 1756, 1757, 1758.
Chemistry of Organic Cyanogen Compounds, Migrdichian, 1947, Reinhold Publishing Corp., N.Y., p. 358.

OSCAR R. VERTIZ, *Primary Examiner.*

BENJAMIN HENKIN, *Examiner.*

B. H. LEVENSON, *Assistant Examiner.*